United States Patent
Hurst, Jr. et al.

[11] Patent Number: 6,115,071
[45] Date of Patent: Sep. 5, 2000

[54] VIDEO SIGNAL COMPRESSION APPARATUS USING NOISE REDUCTION

[75] Inventors: Robert Norman Hurst, Jr., Hopewell; Scott David Casavant, East Windsor; Paul Harquail Meehan, Plainsboro, all of N.J.

[73] Assignee: Thomson Licensing S.A., Cedex, France

[21] Appl. No.: 08/371,039

[22] Filed: Jan. 10, 1995

Related U.S. Application Data

[63] Continuation of application No. 08/136,387, Oct. 13, 1993, abandoned.

[51] Int. Cl.[7] .................................................. H04N 7/12
[52] U.S. Cl. ......................... 348/415; 348/409; 348/623
[58] Field of Search ................................. 348/404, 409, 348/415, 618, 620, 623, 405, 419; H04N 7/137, 7/12

[56] References Cited

U.S. PATENT DOCUMENTS

| | | | |
|---|---|---|---|
| 4,009,334 | 2/1977 | Sypula | 348/623 |
| 4,179,710 | 12/1979 | Ishiguro et al. | 348/419 |
| 4,194,219 | 3/1980 | Drewery | 348/620 |
| 4,249,210 | 2/1981 | Storey et al. | 348/620 |
| 4,538,236 | 8/1985 | Dischert et al. | 348/618 |
| 4,549,212 | 10/1985 | Bayer | 348/618 |
| 4,833,537 | 5/1989 | Takeuchi et al. | 348/620 |
| 4,885,637 | 12/1989 | Shikakura et al. | 348/409 |
| 4,941,043 | 7/1990 | Jass | 348/404 |
| 4,985,768 | 1/1991 | Sugiyama | 348/409 |
| 5,005,082 | 4/1991 | Zdepski et al. | 358/174 |
| 5,010,402 | 4/1991 | Nishino | 348/405 |
| 5,051,826 | 9/1991 | Ishii et al. | 348/409 |
| 5,130,798 | 7/1992 | Christopher | 348/623 |
| 5,161,018 | 11/1992 | Matsunaga | 348/620 |

FOREIGN PATENT DOCUMENTS

| | | |
|---|---|---|
| 346 636 | 12/1989 | European Pat. Off. . |
| 449 555 | 10/1991 | European Pat. Off. . |
| 2 196 205 | 4/1988 | United Kingdom . |

OTHER PUBLICATIONS

*Noise Reduction In Video Signals Using Pre/Post Signal Processing In A Time Division Multiplexed Component System*, by A.A. Acampora et al., RCA Laboratories, Princeton, RCA Review, vol. 47, Sep. 1996, pp. 303–344.

*A 64 Kbits/s Videophone Codec With Forward Analysis and Control*, Signal Processing, Image Communication, vol. 1, No. 2, Oct. 1989, pp. 103–115, by Grotz et al.

*Composite Interframe Coding of NTSC Color Television Signals*, by Ishiguro et al., 1976 IEEE National Telecommunications Conference, vol. 1, Nov. 1976, pp. 6.4–1–6.4–5.

*An HDTV Bit–rate Reduction Codex at the STM–1 Rate of SDH*, Signal Processing, Image Communication, vol. 4, No. 4/5, pp. 345–358, by Sawada et al., Aug. 1992.

*HDTV Coding at Below 45 Mbps for Digital Transmission*, Globecom' 91—IEEE Global Telecommunications Conf. Vol. 1/3, 2nd Dec. 1991, IEEE, pp. 96–100, by Chen et al.

*Primary Examiner*—Richard Lee
*Attorney, Agent, or Firm*—Joseph S. Tripoli; Ronald H. Kurdyla; Alexander J. Burke

[57] ABSTRACT

Noise reduction circuitry, in a video signal compression apparatus of the predictive DPCM compression type includes a simple nonlinear processing element within the DPCM loop to eliminate residues between predicted and real image signals, which are smaller than a predetermined value. Elimination of such residues dramatically reduces the amount of compressed data generated for signals including even modest amounts of noise.

9 Claims, 3 Drawing Sheets

VIDEO SIGNAL COMPRESSION APPARATUS USING NOISE REDUCTION

This is a continuation of application Ser. No. 08/136,387, filed Oct. 13, 1993, now abandoned.

This application relates to noise reduction for differential pulse code modulation DPCM video signal compression apparatus, and more particularly to noise reduction apparatus for use within the DPCM loop.

BACKGROUND OF THE INVENTION

Predictive coding for compression of video signal functions best when current images are easily predicted from temporally adjacent images. However when the source images contain noise, accurate prediction becomes difficult and the compression efficiency declines or the reproduced image quality degrades or both. It is therefore desirable to minimize noise in the video signal to be compressed prior to the compression process.

Consider FIG. 1 which illustrates a prior art predictive image coding system. Elements 12–22 form the actual predictive coder which will be described herein after. Noise reduction, in such prior art systems typically include a recursive noise reduction filter 10 to preprocess the video signal prior to compression. Field or frame recursive filters tend to have been preferred because they can effectively reduce noise components within the bandwidth of the active signal. However, such filters are also very memory intensive and require relatively sophisticated processing circuitry in order to perform significant noise reduction without introducing undesirable artifacts around moving image features It is an object of the present invention to provide a highly effective noise filter apparatus and method for predictive encoders with minimal additional hardware.

SUMMARY OF THE INVENTION

The present invention includes a predictive DPCM compression apparatus wherein a simple nonlinear processing element is included in the DPCM loop to eliminate residues between predicted and real image signals, which are smaller than a predetermined value. Elimination of such residues will dramatically reduce the amount of compressed data generated for signals including even modest amounts of noise.

DETAILED DESCRIPTION

The present invention will be described in the context of video compression similar to that described in the standard being established by the Moving Picture Experts Group (MPEG) of the International Standardisatiom Organisation. Motion compensated predictive encoding, of the type described in the MPEG protocol, requires both intraframe encoding and interframe encoding. That is every $N^{th}$ frame is intraframe encoded to insure regular temporal signal replenishment. Intervening frames are interframe or DPCM predictive encoded with compressed data in successive frames dependent upon prior frames. Intraframe encoded frames are designated I frames and interframe encoded frames are designated either P or B frames depending upon whether they are only forward predicted or both forward and backward predicted respectively. The process of predictive coding involves dividing respective images into small areas, and searching neighboring images to locate identical or nearly identical areas in a neighboring image. The location of the area in the neighboring image and the differences between the area of the current image and the corresponding identical or nearly identical area, of the neighboring image, are coded for transmission. Note that if the corresponding areas are in fact identical, all differences will be zero and an area may be coded with simply a vector identifying the location of the corresponding area and a code indicating that all differences are zero. Thus compressed identical or nearly identical images may be realized with relatively few codewords. Alternatively, if the image contains appreciable noise it will be appreciated that correlation of image areas frame to frame will deteriorate with a concomitant increase in residue data, and a corresponding increase in compressed codewords.

Figure 1:
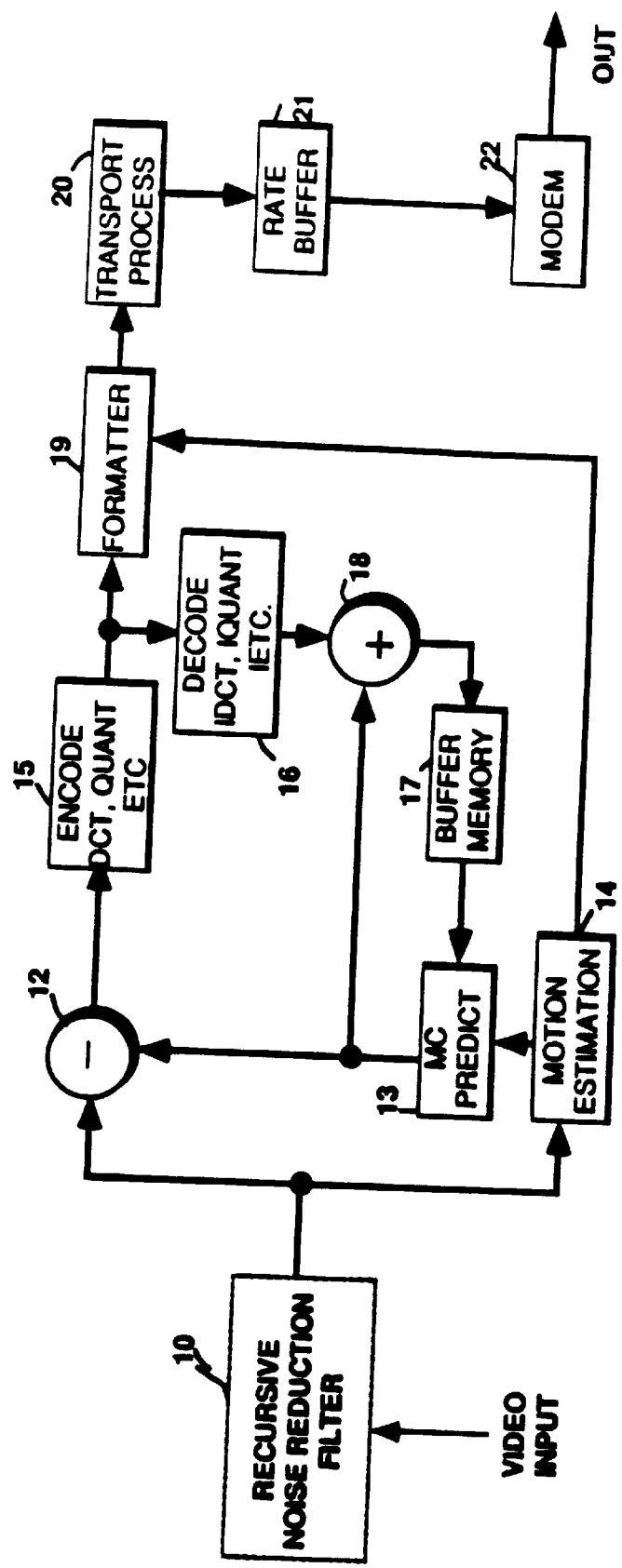
FIG. 1 is a block diagram of prior art DCPM compression apparatus.

In FIG. 1, video signals generated by, for example, a cameras are applied to a recursive noise reducer 10 which conditions the video signals for compression. The remaining apparatus is of relatively well known configuration, hence only a general description will be provided. I frame pixel data from the noise reducer 10, are passed unaltered to the encoder 15 by the subtractor 12. The encoder 15 performs a discrete cosine transform DCT on the pixel data (in blocks of 8×8 pixels) to generate DCT coefficients. The coefficients are quantized to control the data rate and ordered in a predetermined sequence which tends to coalesce the majority of zero valued coefficients for efficient run-length coding. The encoder then run-length and statistically encodes the coefficients. The coded pixel representative data is applied to a formatter 19 which attaches information to indicate the source location of respective blocks within a frame, the coding type, (I, P, B), frame number, time stamps etc. according to the selected compression protocol, for example MPEG 2. The data from the formatter is applied to a transport processor 20 which segments the formatted data into payload packets of particular numbers of bits, generates identifiers to track the respective payloads, generates synchronization information and develops error correction/detection codes, and appends all of the latter to the respective payload packets to form transport packets. The transport packets are applied to an appropriate modem 22,via a rate buffer 21, for transmission.

The I compressed frames from the encoder 15 are applied to a decoder 16 which performs the inverse function of the encoder 15. For I compressed frames the output of the decoder 16 is a reproduced I frame. The decompressed I fame is passed unaltered by the adder 18 to the buffer memory 17 wherein it is stored for predictive compression of subsequent P and B frames. Predictive encoding of P and B frames is similar, and P frame compression will be discussed. The P image frame currently being compressed is applied to a motion estimator 14, which divides the frame into blocks of e.g., 16×16 pixels. The estimator 14 then searches the preceding I or P frame for a similar 16×16 block of pixels, and calculates a set of vectors which indicate the relative difference in spatial coordinates of the block in the current frame and the most nearly identical block in the frame being searched. Using this vector the corresponding block from the corresponding decompressed frame in buffer memory 17 is coupled to the subtractor 12 which subtracts the predicted block from memory 17, on a pixel by pixel basis, from the corresponding block of the current frame being decompressed. The differences or residues provided by the subtractor are applied to the encoder 15 wherein they are processed similar to the I frame pixel data. The vectors generated by the estimator 14 are coupled to the formatter 19 wherein they are included as a portion of the coded data associated with respective blocks.

The compressed P frames are decoded in the decoder 16 and applied to the adder 18. Concurrently the respective blocks of the image frame from which the frame was predicted are accessed from the buffer memory by the predictor 13 and applied to a second input of the adder 18 wherein the decoded residues or differences are added on a pixel by pixel basis to restore the actual image. The restored pixel P frame data from the adder 18 is stored in the buffer memory 17 for predictively encoding/decoding subsequent P and B frames.

It is important to note that when I frames are being processed, the predictor 13 applies zero values to both the subtractor 12 and the adder 18. I frames that are input are therefore passed unaltered by the subtractor 12, and decoded I frames from the decoder 16 are passed unaltered by the adder 18.

Figure 2:
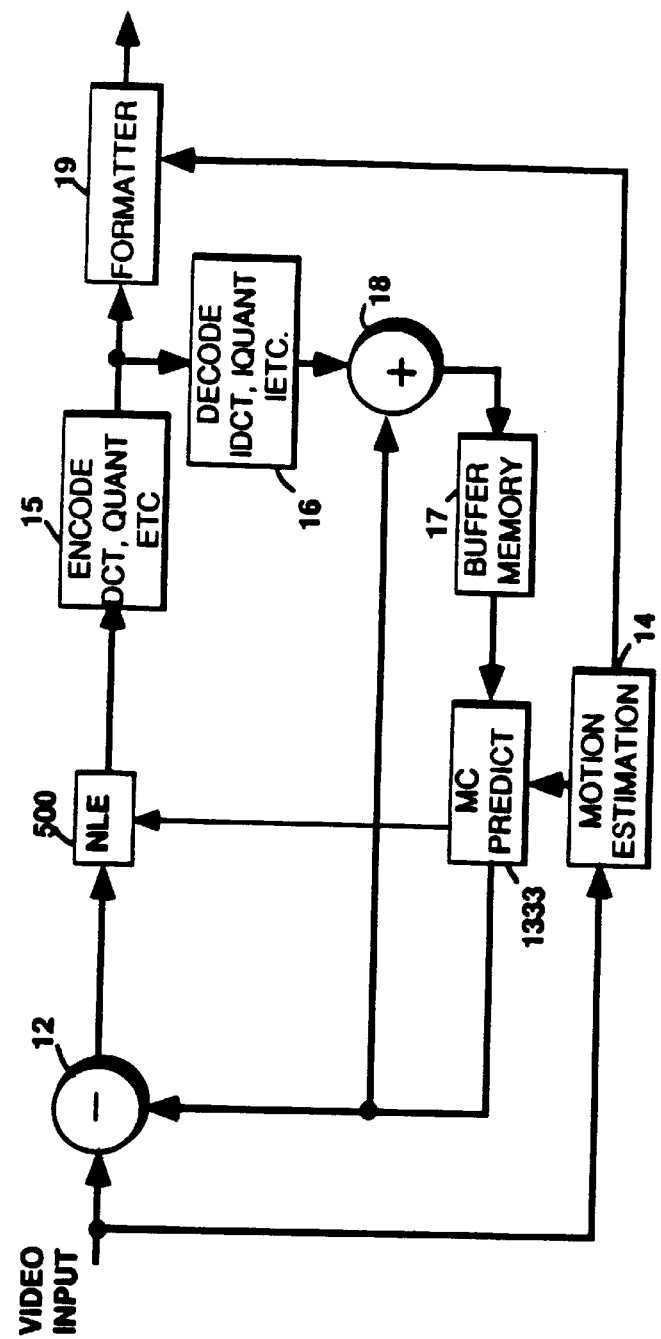
FIGS. 2 and 4 are block diagrams of alternative compression apparatus including noise reduction apparatus according to the present invention.

FIG. 2 illustrates a first embodiment of the invention. In FIG. 2 the compression apparatus is similar to the apparatus of FIG. 1 and elements designated with like numbers as those in FIG. 1 perform like functions. There are two primary differences which are the addition of the non linear element 500, and a slight additional function added to element 1333 which performs the function of element 13 in FIG. 1.

Figure 3:
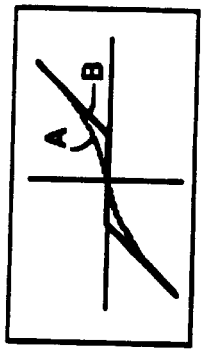
FIGS. 3 and 5 are pictorial diagrams of exemplary nonlinear transfer functions for the noise reduction apparatus of FIGS. 2 and 4.

The non linear element 500 is connected between the subtractor 12 and the encoder 15. This element is arranged to pass only signal values above a predetermined value. Element 500 may be a simple coreing circuit which passes a zero value for all values below a predetermined value and the signal value minus the predetermined value for all values exceeding the predetermined value, as shown by the piecewise linear function (curve B) in FIG. 3. Alternatively it may take the form of a more typical coring circuit which passes a zero value for all signal values less than a predetermined value and the signal value for all signal values which exceed the predetermined value. A further alternative function for element 500 may be a more gently curving function such as the curve designated A in FIG. 3. All of these functions may be provided by programming the functions into respective address locations in memory which is arranged to be addressed by the signal to be processed.

Consider that the compressor performs two types of compression, intraframe and interframe. In the latter type the signal applied to the element 500 are residues resulting from taking pixel differences of two independent frames. In the former, the signal applied to the element 500 is the video signal unaltered. The noise power of the latter is the square root of two greater than the former, and the signal level of the latter is significantly less. Therefore the signal to noise ratio of the intraframe video signal is significantly greater than the signal to noise ratio of the interframe residues, regardless of the amount of noise contaminating the signal.

In view of the difference in signal to noise ratios, the nonlinear function applied during intraframe compression should be different than for interframe compression. For example, if the nonlinear function is piecewise linear coring, the predetermined value below which intraframe values will be cored may be significantly greater than for interframe residues. Alternatively, since the signal to noise ratio of intraframe signals will be relatively large compared to the residues, the nonlinear element may be conditioned to pass intraframe signals unaltered. The relative signal to noise ratios of B frame and P frame predictive coded frames may also be significantly different depending upon the number of B frames between P frames. Thus it may be appropriate to apply different nonlinear functions in element 500 for the different types of predictive coding. Adaptively controlling the nonlinear element is performed by the predictor 1333, which applies respective control signals for I, P and B frames being coded.

Figure 5:
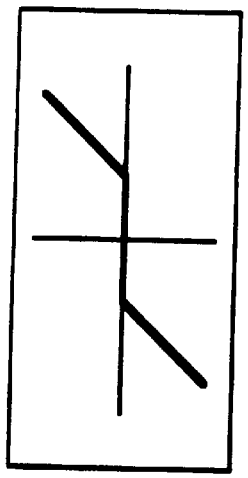
Figure 4:
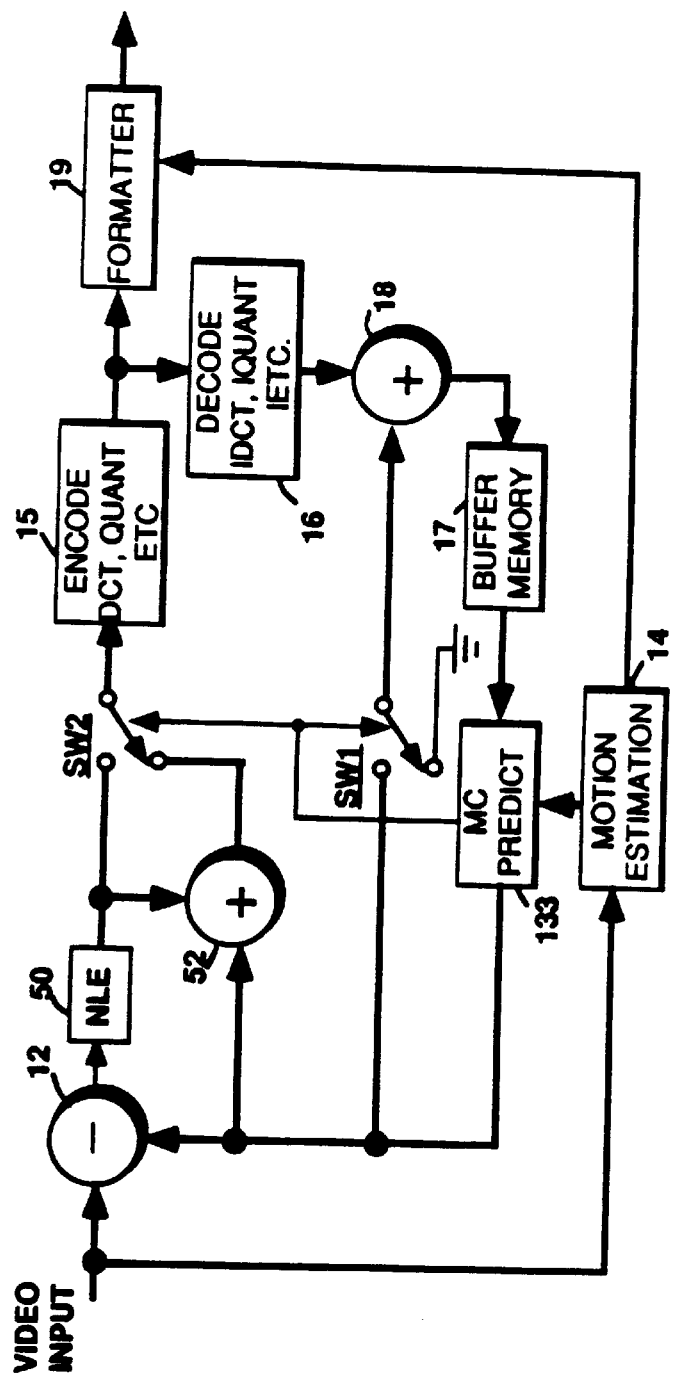

FIG. 4 shows an embodiment conducive to using a similar nonlinear function for all types of compression interframe and intraframe. In FIG. 4 elements designated with like numbers to elements in FIG. 1 are similar and perform like functions. The FIG. 4 circuit includes a nonlinear element 50 between the subtractor 12 and the encoder 15. The function of the nonlinear element may be similar to that shown in FIG. 5 (standard coring function) or a function as described for element 500.

During compression of interframe frames, the switches sw1 and sw2 are in the alternative position to the positions illustrated. With the switches in this position, the system is configured as and operates exactly as the system of FIG. 2 for interframe coding. Thus the nonlinear function of element 50 will be selected in accordance with performance expectations for interframe coding.

For intraframe coding it is necessary that the decoded intraframe signal from decoder 16 pass through the adder 18 unaltered. This is effected by employing switch sw1, which is conditioned by the prediction element 133, to pass a zero values during coding of I frames. Concurrently the switch SW2 is moved to the position shown in FIG. 4.

In order for the nonlinear element to have a beneficial effect on I frame signals, in view of their relatively high signal to noise ratio, the I frame signals are artificially reduced for noise processing and then restored after noise processing. Reduction of the I frame signal is accomplished by generating a predicted I frame and applying the predicted I frame to the subtracter 12. The differences generated by the subtracter will be of the same order of magnitude as the interframe residues, and therefore the nonlinear element will operate similarly thereon. The predicted signal provided from the predictor 133 is then added back to the signal provided from the nonlinear element to restore the input I frame signal to substantially its original value.

Several methods are available to generate predicted I frames. One method is simply to condition the predictor 133 to output blocks of pixels which are collocated with the current I frame, from the last decoded frame in the buffer 17 (which may not be an I frame). But a preferred method, which provides a much more accurate prediction of the I frame is to predict the I frame in a manner similar to predicting P or B frames. Note that prediction requires motion vectors which provide a spatial correspondence between similar blocks of pixels in temporally spaced frames. Coded I frames in general do not include motion vectors. However, since the encoder includes the motion vector generation apparatus for generating vectors for P and B frames, it is a simple matter to program such apparatus to generate motion vectors for I frames also. These motion vectors may be utilized, at the encoder to generate a predicted I frame for noise reduction purposes, and then discarded, i.e. not included in the coded bit stream. Alternatively the I frame motion vectors may be included in the coded bit stream for error concealment purposes as suggested in the MPEG protocol.

Assume the nonlinear element 50 is programmed to pass all signal samples having magnitudes greater than a value of T, which will be nominally quite small. Also assume that the signal provided from the predictor is S(n) and the input I frame signal is I(n). Ignoring the element 50, the signal provided to the upper contact of the switch SW2 is I(n)−S(n). This signal is coupled to one input of an adder 52 and the signal S(n) is applied to a second input of the adder 52. Adder 52 provides the signal I(n)−S(n)+S(n)=I(n). These values are coupled to the encoder 15, and are unchanged from the input values. Only those output values I(n) for which the differences provided by the subtractor 12 are within±T will be affected by the nonlinear element 12. Hence it will be beneficial if the I frame predictions provided by the predictor 133 are very accurate i.e. within a deviation of ±T, in which case the non linear element 50 will substantially only affect noise components.

The foregoing description assumes that frames are encoded in their entirety as intraframe coded frames or as interframe coded frames. In the MPEG standard , for example, the video signal is coded on a block-by-block basis, and provision is made to code certain blocks of P or B frames in the intraframe coding mode if a close match cannot be found for the block in the search frame. In these instances the predictors 13, 133, and 1333 will be programmed to switch the nonlinear processing elements 15, 50 and 500 respectively on a block-by-block basis in accordance with the current processing type. Thus, in the appended claims, if mention is made about compressing frames according to an interframe processing mode, it should be appreciated that ones of the blocks of pixels within such frames may be intraframe processed, and the claims are intended to apply to such mixed mode processed frames.

What is claimed is:

1. Apparatus for compressing video signal in an MPEG like format using both intraframe coding and interframe coding, comprising:

a signal input terminal for applying said video signal;

a subtractor having a first input terminal coupled to said signal input terminal, a second input terminal and an output terminal for providing residues having a range of amplitude values between relatively larger amplitude values and relatively smaller amplitude values;

compression means including transform means, for compressing signal applied thereto, to generate compressed video signal using said both intraframe coding and interframe coding, wherein said residues are included in intraframe coded and interframe coded compressed output data by said compression means;

an image signal prediction means, including inverse transform means, responsive to said compressed video signal for generating intraframe and interframe predictive signals representing predictions of video signal being encoded, said predictive signals being coupled to the second input terminal of said subtractor; and a nonlinear element, coupled between the output terminal of said subtractor and said compression means, for attenuating residues having said relatively larger amplitudes less than residues having said relatively smaller amplitudes.

2. Apparatus for compressing video signal in an MPEG like format using both intraframe coding and interframe coding, comprising:

a signal input terminal for applying said video signal;

a subtractor having a first input terminal coupled to said signal input terminal, a second input terminal and an output terminal for providing residues having a range of amplitude values between relatively larger amplitude values and relatively smaller amplitude values;

compression means including transform means, for compressing signal applied thereto, to generate compressed video signal using said both intraframe coding and interframe coding, wherein said residues are included in intraframe coded and interframe coded compressed output data by said compression means;

an image signal prediction means, including inverse transform means, responsive to said compressed video signal for generating intraframe and interframe predictive signals representing predictions of video signal being encoded, said predictive signals being coupled to the second input terminal of said subtractor; and a nonlinear element, coupled between the output terminal of said subtractor and said compression means, for attenuating residues having said relatively larger amplitudes less than residues having said relatively smaller amplitudes wherein said video signal occurs in frames, and said compression means compresses ones of said frames of said video signal by said intraframe coding and others of said frames by said interframe coding, and wherein said apparatus further includes means for conditioning said nonlinear element to process frames which are being intraframe coded differently than frames which are being interframe coded.

3. The apparatus set forth in claim 2 wherein said nonlinear element is a coring circuit.

4. Apparatus for compressing video signal in an MPEG compatible format using both intraframe coding and interframe coding, comprising:

a signal input terminal for applying said video signal;

a subtractor having a first input terminal coupled to said signal input terminal, a second input terminal and an output terminal for providing residues having a range of amplitude values between relatively larger amplitude values and relatively smaller amplitude values;

compression means including transform means, for compressing signal applied thereto, on a block by block basis, to generate compressed video signal using said both intraframe coding and interframe coding;

an image signal prediction means, including inverse transform means, responsive to said compressed video signal for generating, on a block by block basis, a predictive signal representing a prediction of video signal being encoded, said predictive signal being coupled to the second input terminal of said subtractor; and a nonlinear element, coupled between the output terminal of said subtractor and said compression means, for attenuating residues having said relatively larger amplitudes less than residues having said relatively smaller amplitudes wherein said video signal occurs in frames and said compression means compresses ones of said frames by said intraframe coding and others of said frames by said interframe coding, and wherein said image signal prediction means is arranged to pass predicted image frames to the second input terminal of said subtractor during intervals of said intraframe coding, said apparatus further includes:

an adder having an output terminal, a first input terminal coupled to the second input terminal of said subtractor, and a second input terminal coupled to an output terminal of said nonlinear element;

a switch having first and second input terminals coupled to the output terminals of said nonlinear element and said adder respectively, and having an output terminal coupled to said compression means; and means for conditioning said switch to pass signal applied to its first and second input terminals when frames are interframe and intraframe coded respectively.

5. Multiple mode video signal compression apparatus comprising:

a signal input terminal for applying video signal;

a subtractor having a first input terminal coupled to said signal input terminal, a second input and an output terminal;

transform means, having input and output terminals, for compressing said video signal on a block by block basis;

video signal prediction means, coupled to the output terminal of said transform means, and having an output terminal coupled to the second input terminal of said subtractor, and responsive to compressed said video signal for providing decompressed said video signal on a block by block basis;

a nonlinear element coupled between the input terminal of the transform means and the output terminal of said subtractor, wherein a transfer function of said nonlinear element is responsive to a compression mode of said video signal prediction means for processing signal provided at the output terminal of said subtractor differently for different modes; and wherein said video signal occurs in frames, and respective frames are compressed according to a sequence of different compression processes, said apparatus further including means for conditioning said nonlinear element to function with differing transfer functions for said different compression processes.

6. Multiple mode video signal compression apparatus comprising:

a signal input terminal for applying video signal;

a subtractor having a first input terminal coupled to said signal input terminal, a second input and an output terminal;

transform means, having input and output terminals, for compressing said video signal on a block by block basis;

video signal prediction means, coupled to the output terminal of said transform means, and having an output terminal coupled to the second input terminal of said subtractor, and responsive to compressed said video signal for providing decompressed said video signal on a block by block basis;

a nonlinear element coupled between the input terminal of the transform means and the output terminal of said subtractor, wherein a transfer function of said nonlinear element is responsive to a compression mode of said video signal prediction means for processing signal provided at the output terminal of said subtractor differently for different modes; and further including means for conditioning said nonlinear element to exhibit different transfer functions for different image blocks on a block by block basis.

7. Multiple mode video signal compression apparatus comprising:

a signal input terminal for applying video signal;

a subtractor having a first input terminal coupled to said signal input terminal, a second input and an output terminal;

transform means, having input and output terminals, for compressing said video signal on a block by block basis;

video signal prediction means, coupled to the output terminal of said transform means, and having an output terminal coupled to the second input terminal of said subtractor, and responsive to compressed said video signal for providing decompressed said video signal on a block by block basis;

a nonlinear element coupled between the input terminal of the transform means and the output terminal of said subtractor, wherein a transfer function of said nonlinear element is responsive to a compression mode of said video signal prediction means for processing signal provided at the output terminal of said subtractor differently for different modes; and further including means responsive to the compression mode of said video signal prediction means for bypassing said nonlinear element transfer function.

8. Multiple mode video signal compression apparatus comprising:

a signal input terminal for applying video signal;

a subtractor having a first input terminal coupled to said signal input terminal, a second input and an output terminal;

transform means, having input and output terminals, for compressing said video signal on a block by block basis;

video signal prediction means, coupled to the output terminal of said transform means, and having an output terminal coupled to the second input terminal of said subtractor, and responsive to compressed said video signal for providing decompressed said video signal on a block by block basis;

a nonlinear element coupled between the input terminal of the transform means and the output terminal of said subtractor, wherein a transfer function of said nonlinear element is responsive to a compression mode of said video signal prediction means for processing signal provided at the output terminal of said subtractor differently for different modes; and further including means for conditioning said non linear element to provide a linear transfer function in response to the compression mode of said video signal prediction means.

9. Apparatus for compressing video signal in multiple modes, comprising:

a signal input terminal for applying said video signal;

a subtractor having a first input terminal coupled to said signal input terminal, a second input terminal and an output terminal for providing residues having a range of amplitude values between relatively larger amplitude values and relatively smaller amplitude values;

motion compensated compression means including image signal prediction means, for generating, on a block by block basis, a predictive signal representing a prediction of video signal being compressed, said predictive signal being coupled to the second input terminal of said subtractor, wherein said residues in said multiple modes are formed into compressed output data by said motion compensated compression means;

a nonlinear element, coupled between the output terminal of said subtractor and said compression means, for attenuating residues having said relatively larger amplitudes less than residues having said relatively smaller amplitudes; and means for applying only residues processed by said nonlinear element to said motion compensated compression means in a first compression mode, and for applying a combination of residues, and predictive signal from said motion compensated compression means, to said motion compensated compression means in a second compression mode.

* * * * *